G. Gunther,
Musical Attachment to Cages,
Nº 56,407. Patented July 17, 1866.

Witnesses  Inventor:

UNITED STATES PATENT OFFICE.

G. GUNTHER, OF NEW YORK, N. Y.

MUSICAL ATTACHMENT TO BIRD-CAGES.

Specification forming part of Letters Patent No. 56,407, dated July 17, 1866.

*To all whom it may concern:*

Be it known that I, G. GUNTHER, of the city, county, and State of New York, have invented a new and Improved Musical Attachment to Cages; and I do hereby declare that the following is a full, clear, and exact description thereof, which will enable others skilled in the art to make and use the same, reference being had to the accompanying drawings, forming part of this specification, in which—

Figure 1:
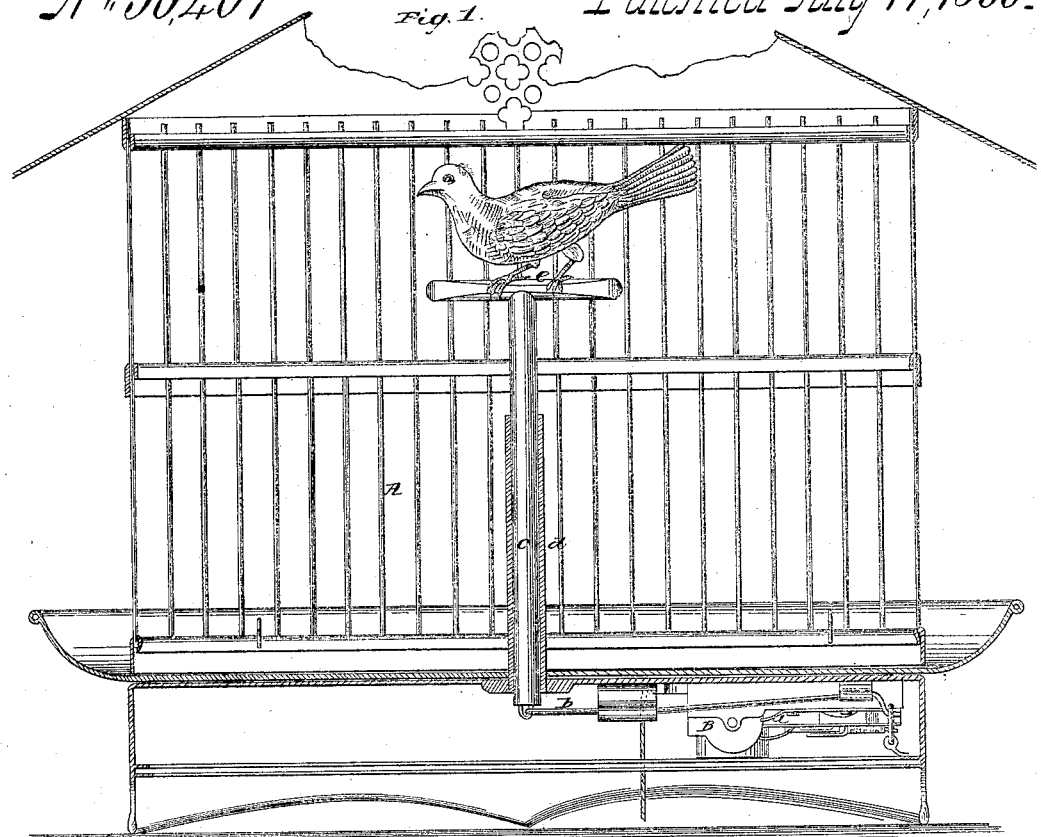
Figure 2:
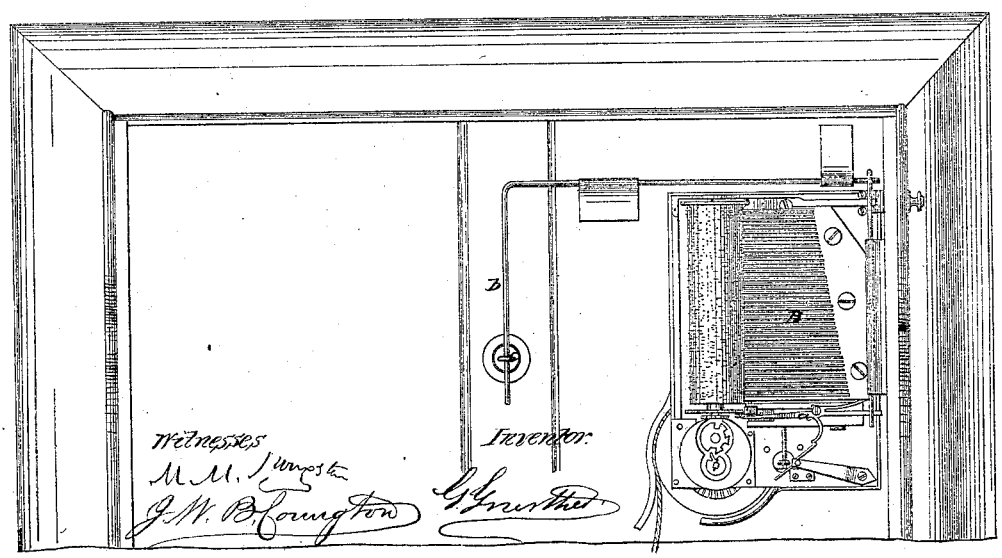

Figure 1 represents a longitudinal vertical section of this invention. Fig. 2 is an inverted plan of the same.

Similar letters of reference indicate like parts.

This invention consists in the application of a music-box or other equivalent device to a cage, in combination with a suitable detaching-lever and rod extending in the interior of the cage in such a manner that whenever the bird or other animal which occupies said cage jumps or steps upon the rod or stop-lever the music-box or other device begins to play, (provided the same is wound up,) and an agreeable surprise to the persons in the room and to the bird or other animal in the cage is effected.

In the drawings I have represented a bird-cage, A, to the bottom of which is secured a music-box, B, of the ordinary or any suitable construction. The stop-lever $a$ of this box is detached or released by means of the lever $b$, which extends to the middle of the cage, where it connects with the upright bar $c$. This box is guided in a tubular socket, $d$, rising from the bottom of the cage, and it may be provided with a cross-bar, $e$. The weight of the bars $c$ $e$ is so adjusted that the same is not sufficient to release the stop-lever $a$; but as soon as the bird jumps on the bar $e$ (see Fig. 1) the lever $b$ is depressed and the stop-lever is released, causing the music-box to play, provided the same is wound up. The winding up is effected by pulling the cord $f$, to which a ring may be attached, for the sake of greater convenience in handling, and to prevent it from passing clear into the box.

It is obvious that any other musical device besides an ordinary music-box might be applied to the cage in the same manner and made to go off by a bird or any other animal inclosed in the cage; and I do not wish to confine myself to the precise form of the cage nor to the construction of the musical device shown in the drawings.

What I claim as new, and desire to secure by Letters Patent, is—

The application to a cage, A, of a musical device—such, for instance, as an ordinary music-box—in combination with a suitable lever, $b$, and bar $c$, substantially as and for the purpose described.

G. GUNTHER.

Witnesses:
M. M. LIVINGSTON,
W. HAUFF.